(12) United States Patent
Phillips et al.

(10) Patent No.: US 7,880,942 B1
(45) Date of Patent: Feb. 1, 2011

(54) METHOD AND APPARATUS FOR CONVERTING COLOR COEFFICIENTS BETWEEN COLOR SPACES

(75) Inventors: Matthew J. Phillips, Champaign, IL (US); Lars U. Borg, Saratoga, CA (US); Manish S. Kulkarni, Saratoga, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1177 days.

(21) Appl. No.: 11/369,350

(22) Filed: Mar. 7, 2006

(51) Int. Cl.
*G03F 3/08* (2006.01)

(52) U.S. Cl. .................. 358/518; 358/1.9; 358/529; 382/162; 382/167; 345/590; 345/600; 345/603; 345/604

(58) Field of Classification Search ............ 358/1.9, 358/518, 529; 382/162, 167
See application file for complete search history.

(56) References Cited

U.S. PATENT DOCUMENTS

| 5,243,414 | A | | 9/1993 | Dalrymple et al. |
|---|---|---|---|---|
| 5,335,097 | A | | 8/1994 | Murakami |
| 5,359,436 | A | * | 10/1994 | Dichter et al. ............ 358/500 |
| 5,481,655 | A | | 1/1996 | Jacobs |
| 5,483,360 | A | | 1/1996 | Rolleston et al. |
| 5,636,290 | A | | 6/1997 | Kita et al. |
| 5,774,238 | A | | 6/1998 | Tsukada |
| 6,088,038 | A | * | 7/2000 | Edge et al. .................. 345/600 |
| 6,222,639 | B1 | * | 4/2001 | Suzuki ....................... 358/1.9 |
| 7,046,393 | B2 | * | 5/2006 | Zeng .......................... 358/1.9 |
| 7,227,666 | B1 | * | 6/2007 | MacLeod .................... 358/1.9 |
| 2003/0210414 | A1 | * | 11/2003 | Kuno ......................... 358/1.9 |
| 2004/0145759 | A1 | * | 7/2004 | Nishida et al. ............... 358/1.9 |
| 2004/0212817 | A1 | | 10/2004 | Hagai et al. |
| 2005/0141777 | A1 | | 6/2005 | Kuwata |
| 2005/0206927 | A1 | * | 9/2005 | Yamada ...................... 358/1.9 |
| 2005/0248785 | A1 | * | 11/2005 | Henley et al. ................ 358/1.9 |
| 2006/0098219 | A1 | * | 5/2006 | Kajihara ..................... 358/1.9 |
| 2006/0146082 | A1 | * | 7/2006 | Nunokawa et al. ........... 347/15 |

* cited by examiner

*Primary Examiner*—Mark K Zimmerman
*Assistant Examiner*—Miya J Cato
(74) *Attorney, Agent, or Firm*—Robert C. Kowert; Meyertons, Hood, Kivlin, Kowert & Goetzel, P.C.

(57) ABSTRACT

A system that converts color coefficients between color spaces. During operation, the system receives a color profile comprising a lookup table which defines a conversion of color coefficients between a source color space and a destination color space, wherein the source color space includes a black color channel. Next, the system identifies a darkest output color value in the destination color space produced by the color profile, and also identifies entries in the lookup table corresponding to a maximum possible value for the black color channel of the source color space. The system then updates the identified entries with an achromatic equivalent of the identified darkest output color value, whereby source colors having the maximum possible value for the black color channel are mapped to the achromatic equivalent of the identified darkest output color value.

18 Claims, 2 Drawing Sheets

METHOD AND APPARATUS FOR CONVERTING COLOR COEFFICIENTS BETWEEN COLOR SPACES

BACKGROUND

1. Field of the Invention

The present invention relates to techniques for converting color coefficients between color spaces based on color profiles.

2. Related Art

Color-management systems (CMSs) attempt to ensure that color values that are displayed on one output device appear the same when the color values are displayed on a different output device. To accomplish this, CMSs use color profiles, which describe how a given output device reproduces color, to ensure that color values are properly converted for a specific output device. Given two color profiles for different output devices, a set of color coefficients that represent a given color value on one output device can be converted to a corresponding set of color coefficients that represent the same color value on another output device.

Color values are defined with reference to "color spaces," such as XYZ, LAB, RGB (red, green, blue), and CMYK (cyan, magenta, yellow, key/black). Different color spaces are used for different applications. For example, CMYK is typically used for print applications, whereas RGB is typically used for displaying colors on a computer display.

When displaying or printing CMYK colors on a non-CMYK device (such as an RGB display, an RGB printer, or a grey printer) combinations of color profiles are typically used to convert colors coefficients in the CMYK color space to color coefficients in the destination color space (i.e. RGB or grey).

However, color profiles are commonly-used to convert CMYK black (K=100%) to a color value other than RGB black (R=G=B=0), which can have undesirable consequences in some cases. For example, consider a CMYK document created for a newspaper press. Black text within the CMYK document is actually printed as a shade of grey on newsprint. On the other hand, in order to display the black newspaper text on an RGB display, the CMYK color coefficients for the black newspaper text are first converted into RGB color coefficients. However, this conversion process causes the black newspaper text to be displayed as a shade of grey on the computer display. Hence, a user viewing the text on the computer display does not know whether the text will be printed as black or as grey.

There are several existing techniques for converting CMYK colors into RGB equivalents:

(1) Conversions using the process described in *PostScript Language Reference, Third Edition*, p. 477 (Section 7.2.4 Conversion from DeviceCMYK to DeviceRGB), which use simple mathematical relationships to map between R, G, B color coefficients and C, M, Y, K color coefficients (see Adobe Systems Incorporated. *PostScript Language Reference, Third Edition*. Reading: Addison-Wesley Publishing Company, 1999.);

(2) a combination of two color profiles; the first profile (e.g. CMYK) is used to produce color coefficients for the color values in a "device-independent" color space (e.g. LAB or XYZ), which are then processed using the second color profile (e.g. RGB) to obtain equivalent RGB color coefficients. Typically, a combination of matrices and lookup tables are used for these conversions; or (3) device link profiles, which perform a direct mapping from CMYK to RGB using a single lookup table.

Unfortunately, none of the above techniques produce idealized black conversions without problems.

(1) The conversion process described in *PostScript Language Reference, Third Edition*, p. 477, produces idealized black, but generates unacceptably inaccurate representations of most other CMYK colors.

(2) Combinations of color profiles allow for high-quality color transformations, but even with black-point compensation, input color values with K=100% do not automatically map to RGB black. Note that black-point compensation adjusts CMYK to RGB color conversions so that the darkest CMYK color value (C=M=Y=K=100%) maps to the darkest RGB color value (R=G=B=0). In order to achieve idealized black conversion, a special CMYK profile must be specially constructed to take advantage of black-point compensation to achieve idealized black. Unfortunately, because the CMYK profile must be specially constructed, the flexibility of the International Color Consortium (ICC) framework is lost.

(3) Device link profiles can achieve idealized black conversions, but unfortunately, these profiles have a number of problems: the profiles are not common; the software to create them is complicated and/or expensive; and few applications support them.

Another technique is to treat K=100% as a special case and map it to RGB or grey black. However, this results in a sudden transition from grey to black as the K-channel color coefficient goes from 99% to 100%. Furthermore, this technique can only be applied to the special case where there are "solid" areas of color, not gradients or images. Otherwise, a black endpoint of a gradient may not match the color of adjacent black text.

Hence, what is needed is a method and an apparatus for providing a idealized black conversion of CMYK color values without the problems described above.

SUMMARY

One embodiment of the present invention provides a system that converts color coefficients between color spaces. During operation, the system receives a color profile comprising a lookup table which defines a conversion of color coefficients between a source color space and a destination color space, wherein the source color space includes a black color channel. Next, the system identifies a darkest output color value in the destination color space produced by the color profile, and also identifies entries in the lookup table corresponding to a maximum possible value for the black color channel of the source color space. The system then updates the identified entries with an achromatic equivalent of the identified darkest output color value, whereby source colors having the maximum possible value for the black color channel are mapped to the achromatic equivalent of the identified darkest output color value.

In a variation on this embodiment, the source color space is CMYK.

In a further variation, the identified entries in the lookup table correspond to entries whose K channel coefficients are 100%.

In a variation on this embodiment, the destination color space is XYZ, LAB, monochrome grey, or RGB.

In a variation on this embodiment, the system receives an input image containing colors represented by color coefficients in the source color space. The system then uses the updated color profile to convert color coefficients in the source color space for the input image to color coefficients in the destination color space to produce a destination image.

In a further variation, while using the updated color profile to convert color coefficients, the system interpolates between color values in the lookup table, whereby colors in the source color space which are close to the maximum possible value for the black color channel are mapped to colors in the destination color space which are close to the achromatic equivalent of the darkest output value, thereby creating smooth transitions as colors in the destination color space approach the darkest output color value.

In a further variation, the destination color space is a reference color space, and the system additionally uses an output color profile to convert the color coefficients in the reference color space for the destination image into color coefficients in the output color space to produce an output image.

DETAILED DESCRIPTION

Figure 1:
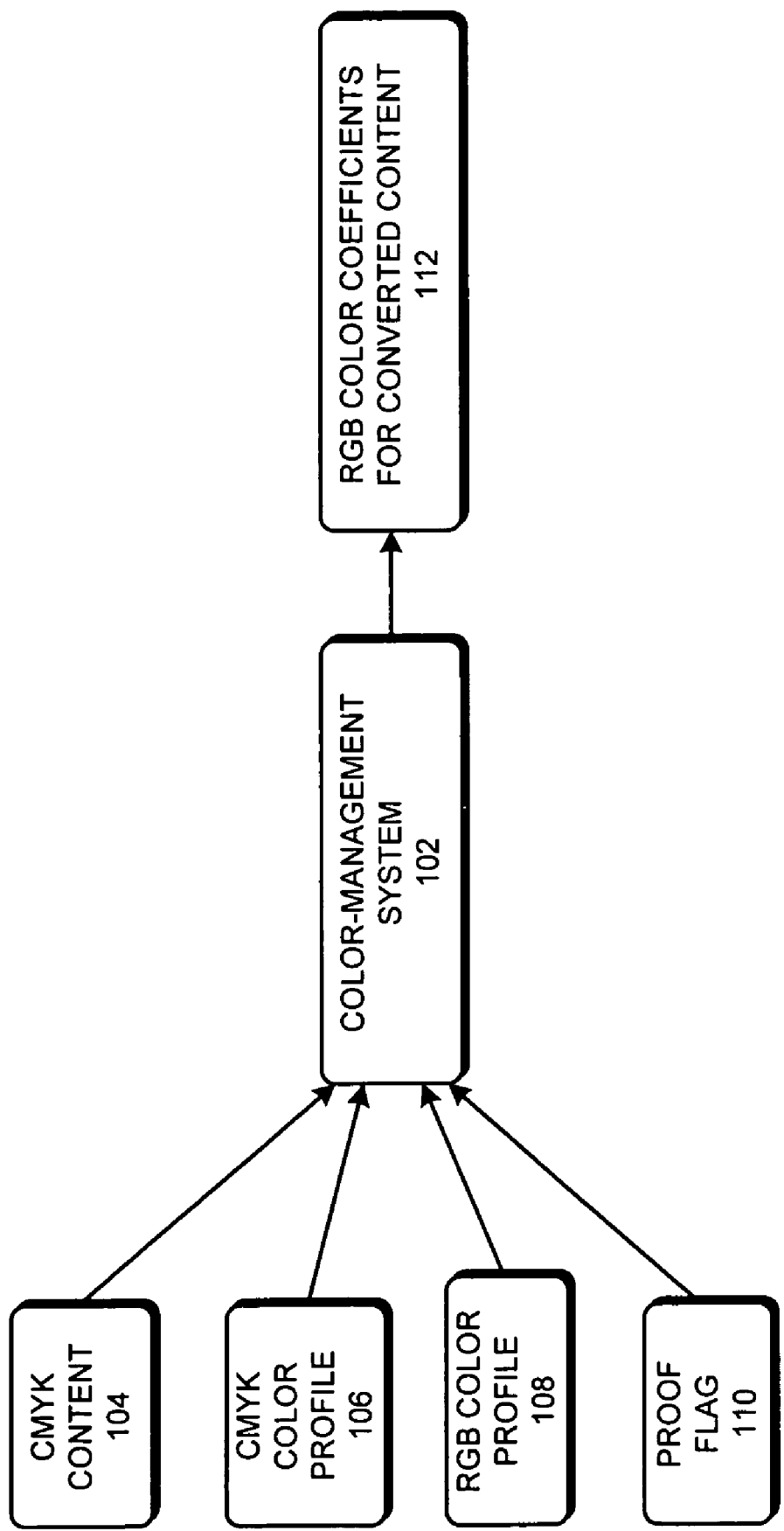
FIG. 1 presents a block diagram of the inputs and outputs of a color-management system in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Overview

One embodiment of the present invention modifies color profiles to achieve "idealized" conversion of CMYK black without affecting the accuracy of converting other colors in the CMYK color space. In doing so, it maps color values for CMYK content where the (K-channel is 100%) to an idealized black color in a destination color space. Another embodiment of the present invention maps color values for CMYK content where K=100% to the "RGB black point" (i.e. R=G=B=0). Yet another embodiment of the present invention maps color values for CMYK content where K=100% to the "Grey black point" (i.e. Grey=0).

One embodiment of the present invention also creates a smooth color transition region near K=100% (e.g., K=95%) so that there is no sudden increase in darkness as the K-channel color coefficient goes from 99% black to 100% black.

In one embodiment of the present invention, the user is given the option whether to apply the idealized black option or not. For example, a user enters into an idealized black mode when editing text and exits the idealized black mode when proofing a document.

One embodiment of the present invention dynamically overrides or modifies the lookup tables in the CMYK profile such that the entries near the K=100% tables are set to the darkest color in the source color space. Black point conversion (BPC) is then used to map the darkest color in the source color space to the darkest color in the destination color space. As a result, K=100% is guaranteed to map to black in the destination color space (e.g. RGB or Grey). Because the CMS interpolates between points in the lookup table, the result is a smooth transition to PCS black as K approaches 100%. Moreover, because the remaining table points are unaffected, only the region where K approaches 100% is affected; all other points convert "accurately." Because the color profile lookup table is modified in-place before high-performance color conversion optimizations are used, performance is only minimally affected by this modification.

Color-Management System

FIG. 1 presents a block diagram of the inputs and outputs of color-management system 102 in accordance with an embodiment of the present invention. Color-management system 102 takes CMYK content 104, CMYK color profile 106, RGB color profile 108, proof flag 110 as inputs and generates RGB color coefficients for the converted CMYK content 112 as an output. Note that proof flag 110 indicates whether the user has selected the idealized black option or not.

One embodiment of the present invention converts color coefficients for CMYK content 104 into a device independent color space. Note that in this embodiment, RGB color profile 108 is not used. Furthermore, in this embodiment, instead of producing RGB color coefficients for the converted content 112, color-management system 102 produces color coefficients for CMYK content 104 in the device-independent color space.

Updating Color Profiles

Figure 2:
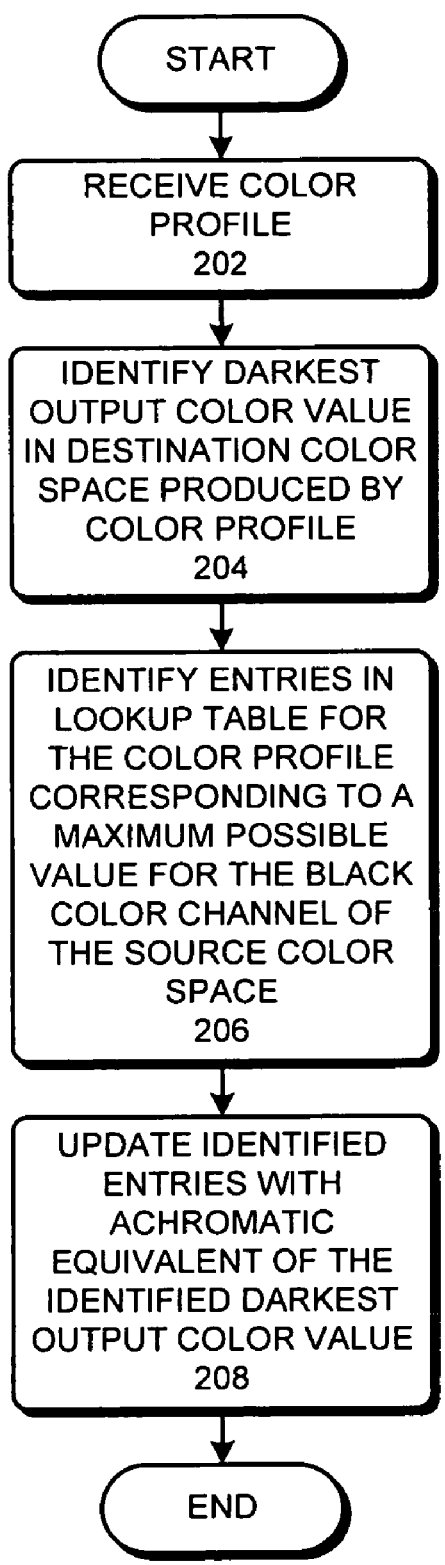
FIG. 2 presents a flow chart illustrating the process of updating a color profile in accordance with an embodiment of the present invention.

FIG. 2 presents a flow chart illustrating the process of updating a color profile in accordance with an embodiment of the present invention. The process begins when the CMS receives a color profile comprising a lookup table which defines a conversion of color coefficients between a source color space and a destination color space (step 202). In one embodiment of the present invention, the source color space includes a black color channel. For example, the source color space can be CMYK. Moreover, the destination color space can be XYZ, LAB, monochrome grey, or RGB.

Next the CMS identifies a darkest output color value in the destination color space which is produced by the color profile (step 204), and also identifies entries in the lookup table corresponding to a maximum possible value for the black color channel of the source color space (step 206). In one embodiment of the present invention, the identified entries in the lookup table correspond to entries whose K-channel coefficients are 100%.

The CMS then updates the identified entries with an achromatic equivalent of the identified darkest output color value (step 208). In doing so, source colors having the maximum possible value for the black color channel are mapped to the achromatic equivalent of the identified darkest output color value. Note that an achromatic color value has no hue or chromatic component. For example, achromatic colors include white, black and grey. Note that in step 204, the darkest output color value may include color. One embodiment of the present invention only uses the "darkness value"

of the color (i.e. the non-color components of the darkest color) when updating the identified entries of the lookup table.

Figure 3:
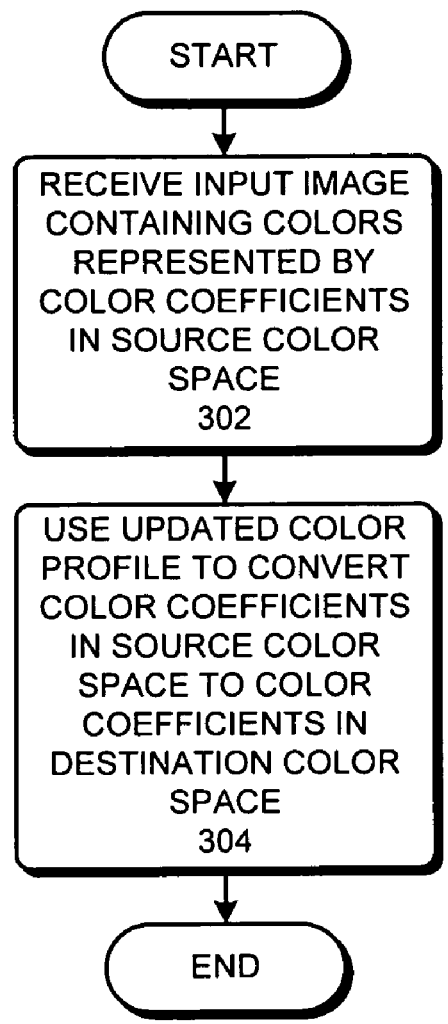
FIG. 3 presents a flow chart illustrating the process of converting an image between color spaces in accordance with an embodiment of the present invention.

FIG. 3 presents a flow chart illustrating the process of converting an image between color spaces in accordance with an embodiment of the present invention. The process begins when the CMS receives an input image containing colors represented by color coefficients in the source color space (step 302). The CMS then uses the updated color profile to convert color coefficients in the source color space for the input image to color coefficients in the destination color space to produce a destination image (step 304).

In one embodiment of the present invention, while using the updated color profile to convert color coefficients, the CMS interpolates between color values in a lookup table. In doing so, colors in the source color space which are close to the maximum possible value for the black color channel are mapped to colors in the destination color space which are close to the achromatic equivalent of the darkest output value. In this way, smooth transitions are created as colors in the destination color space approach the darkest output color value.

In one embodiment of the present invention Black Point Compensation (BPC) is used to map the darkest color of the source color space to the darkest color in the destination color space. The BPC technique then adjusts "in-between colors" (i.e. colors between the darkest color and the next darkest color in the lookup table for the color profile) linearly. Hence, 400% CMYK (which is not fully black) is mapped to 000 RGB. Note that BPC is a dynamic range-mapping technique which maps the dynamic range of the source color space to the dynamic range of the destination color space. For example, if the source color space is CMYK and the destination color space is RGB, BPC maps the dynamic range of the CMYK color space (0-400%) to the dynamic range of the RGB color space (0-255).

In one embodiment of the present invention, the destination color space is a reference color space. In this embodiment, the system first converts the color coefficients for the input image in the source color space into color coefficients in the reference color space to produce a destination image. Next, the CMS uses an output color profile to convert the color coefficients in the reference color space for the destination image into color coefficients in the output color space to produce an output image.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for converting color coefficients between color spaces, comprising:
   using a computer to perform:
   receiving a color profile comprising a lookup table which defines a conversion of color coefficients between a source color space and a destination color space, wherein the source color space comprises a CMYK color space and includes a black color channel, and wherein the destination color space comprises a non-CMYK color space;
   identifying a darkest output color value in the destination color space produced by the color profile, wherein the darkest output color value includes a chromatic component;
   identifying entries in the lookup table corresponding to a maximum possible value for the black color channel of the source color space, wherein each of the identified entries comprises a respective mapping from a respective source color in the source color space to a respective destination color in the destination color space; and
   updating the identified entries to map each respective source color having the maximum possible value for the black color channel to an updated destination color having an achromatic equivalent of the identified darkest output color value, wherein the updated destination color is represented as a color in the destination color space.

2. The method of claim 1, wherein the identified entries in the lookup table correspond to entries whose K-channel coefficients are 100%.

3. The method of claim 1, wherein the destination color space is XYZ, LAB, monochrome grey, or RGB.

4. The method of claim 1, further comprising:
   receiving an input image containing colors represented by color coefficients in the source color space; and
   using the updated color profile to convert color coefficients in the source color space for the input image to color coefficients in the destination color space to produce a destination image.

5. The method of claim 4, wherein using the updated color profile to convert color coefficients involves interpolating between color values in the lookup table, whereby colors in the source color space which are close to the maximum possible value for the black color channel are mapped to colors in the destination color space which are close to the achromatic equivalent of the darkest output value, thereby creating smooth transitions as colors in the destination color space approach the darkest output color value.

6. The method of claim 4, wherein the destination color space is a reference color space, and wherein the method further comprises using an output color profile to convert the color coefficients in the reference color space for the destination image into corresponding color coefficients in the output color space to produce an output image.

7. A non-transitory computer-readable storage medium storing instructions that when executed by a computer cause the computer to perform a method for converting color coefficients between color spaces, wherein the method comprises:
   receiving a color profile comprising a lookup table which defines a conversion of color coefficients between a source color space and a destination color space, wherein the source color space comprises a CMYK color space and includes a black color channel, and wherein the destination color space comprises a non-CMYK color space;
   identifying a darkest output color value in the destination color space produced by the color profile, wherein the darkest output color value includes a chromatic component;
   identifying entries in the lookup table corresponding to a maximum possible value for the black color channel of the source color space, wherein each of the identified entries comprises a respective mapping from a respective source color in the source color space to a respective destination color in the destination color space; and updating the identified entries to map each respective source color having the maximum possible value for the black color channel to an updated destination color having an achromatic equivalent of the identified darkest output color value, wherein the updated destination color is represented as a color in the destination color space.

8. The computer-readable storage medium of claim 7, wherein the identified entries in the lookup table correspond to entries whose K-channel coefficients are 100%.

9. The computer-readable storage medium of claim 7, wherein the destination color space is XYZ, LAB, monochrome grey, or RGB.

10. The computer-readable storage medium of claim 7, wherein the method further comprises:
receiving an input image containing colors represented by color coefficients in the source color space; and
using the updated color profile to convert color coefficients in the source color space for the input image to color coefficients in the destination color space to produce a destination image.

11. The computer-readable storage medium of claim 10, wherein using the updated color profile to convert color coefficients involves interpolating between color values in the lookup table, whereby colors in the source color space which are close to the maximum possible value for the black color channel are mapped to colors in the destination color space which are close to the achromatic equivalent of the darkest output value, thereby creating smooth transitions as colors in the destination color space approach the darkest output color value.

12. The computer-readable storage medium of claim 10, wherein the destination color space is a reference color space, and wherein the method further comprises using an output color profile to convert the color coefficients in the reference color space for the destination image into corresponding color coefficients in the output color space to produce an output image.

13. An apparatus that converts color coefficients between color spaces, comprising:
a receiving mechanism configured to receive a color profile comprising a lookup table which defines a conversion of color coefficients between a source color space and a destination color space, wherein the source color space comprises a CMYK color space and includes a black color channel, and wherein the destination color space comprises a non-CMYK color space;
a profile-updating mechanism configured to:
identify a darkest output color value in the destination color space produced by the color profile, wherein the darkest output color value includes a chromatic component;
identify entries in the lookup table corresponding to a maximum possible value for the black color channel of the source color space, wherein each of the identified entries comprises a respective mapping from a respective source color in the source color space to a respective destination color in the destination color space; and to
update the identified entries to map each respective source color having the maximum possible value for the black color channel to an updated destination color having an achromatic equivalent of the identified darkest output color value, wherein the updated destination color is represented as a color in the destination color space.

14. The apparatus of claim 13, wherein the identified entries in the lookup table correspond to entries whose K-channel coefficients are 100%.

15. The apparatus of claim 13, wherein the destination color space is XYZ, LAB, monochrome grey, or RGB.

16. The apparatus of claim 13, further comprising a color-conversion mechanism configured to:
receive an input image containing colors represented by color coefficients in the source color space; and to
use the updated color profile to convert color coefficients in the source color space for the input image to color coefficients in the destination color space to produce a destination image.

17. The apparatus of claim 16, wherein while using the updated color profile to convert color coefficients, the color-conversion mechanism interpolates between color values in the lookup table, whereby colors in the source color space which are close to the maximum possible value for the black color channel are mapped to colors in the destination color space which are close to the achromatic equivalent of the darkest output value, thereby creating smooth transitions as colors in the destination color space approach the darkest output color value.

18. The apparatus of claim 16, wherein the destination color space is a reference color space, and wherein the color-conversion mechanism is configured to use an output color profile to convert the color coefficients in the reference color space for the destination image into corresponding color coefficients in the output color space to produce an output image.

* * * * *